(12) United States Patent
Irie et al.

(10) Patent No.: US 10,648,524 B2
(45) Date of Patent: May 12, 2020

(54) BRAKE DEVICE

(71) Applicant: MITSUBISHI ELECTRIC CORPORATION, Chiyoda-ku (JP)

(72) Inventors: Maya Irie, Chiyoda-ku (JP); Yoshiko Ono, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 50 days.

(21) Appl. No.: 15/737,887

(22) PCT Filed: Jul. 15, 2015

(86) PCT No.: PCT/JP2015/070271
§ 371 (c)(1),
(2) Date: Dec. 19, 2017

(87) PCT Pub. No.: WO2017/009974
PCT Pub. Date: Jan. 19, 2017

(65) Prior Publication Data
US 2018/0298968 A1   Oct. 18, 2018

(51) Int. Cl.
*B60T 13/14* (2006.01)
*F16D 65/16* (2006.01)
*F16D 65/22* (2006.01)
*B66D 5/26* (2006.01)
*B66D 5/14* (2006.01)
(Continued)

(52) U.S. Cl.
CPC ............. *F16D 65/16* (2013.01); *B66B 1/365* (2013.01); *B66D 5/14* (2013.01); *B66D 5/26* (2013.01); *F16D 55/02* (2013.01); *F16D 65/22* (2013.01); *F16D 65/183* (2013.01); *F16D 2121/10* (2013.01); *F16D 2121/14* (2013.01)

(58) Field of Classification Search
CPC .......... F16D 55/02; F16D 65/16; F16D 65/22; F16D 65/183; F16D 2121/10; F16D 2121/14; B60T 13/04; B60T 13/14; B66B 1/365; B66D 5/14
See application file for complete search history.

(56) References Cited

U.S. PATENT DOCUMENTS 6,193,026 B1 *   2/2001   Sevilleja ................. B60T 13/22
                                                            187/288
2017/0015536 A1 *   1/2017   Irie ........................ F16D 65/28

FOREIGN PATENT DOCUMENTS

CN         2826071 Y      10/2006
DE       10135029 A1      2/2003
(Continued)

OTHER PUBLICATIONS

International Search Report dated Aug. 11, 2015 in PCT/JP2015/070271, filed on Jul. 15, 2015.
(Continued)

*Primary Examiner* — Thomas W Irvin
(74) *Attorney, Agent, or Firm* — Xsensus LLP

(57) ABSTRACT

In a brake device configured to perform braking and releasing of a disc by moving a rod having a lining at a leading end of the rod by a spring device, a cylinder tube of a pressure control unit is arranged adjacent to a pressure storage unit configured to store a compressed fluid. When the disc is to be released, a pressure-receiving piston is moved to a releasing position. When the disc is to be braked, the pressure-receiving piston is returned to braking position.

18 Claims, 7 Drawing Sheets

(51) Int. Cl.
    *B66B 1/36*     (2006.01)
    *F16D 55/02*     (2006.01)
    *F16D 121/10*     (2012.01)
    *F16D 121/14*     (2012.01)
    *F16D 65/18*     (2006.01)

(56) References Cited

FOREIGN PATENT DOCUMENTS

| | | |
|---|---|---|
| JP | 2007-137626 A | 6/2007 |
| JP | 2009-540223 A | 11/2009 |
| JP | 2010-127301 A | 6/2010 |
| JP | 2015-101438 A | 6/2015 |

OTHER PUBLICATIONS

Chinese Office Action dated Dec. 26, 2018 for corresponding Chinese Application No. 201580081648.9, with English Translation, 17 pages.

Notice of Reasons for Refusal dated Mar. 11, 2020, issued in corresponding German Application No. 11 2015 006 700.0, with English Translation, 11 pages.

\* cited by examiner

BRAKE DEVICE

TECHNICAL FIELD

The present invention relates to a brake device, and more particularly, to a brake device to be used in an elevator hoisting machine.

BACKGROUND ART

As a method of integrating functions in a system for supplying a compressed fluid to an operation machine, there is known a fluid system including a function block for integrating a filter, valves, and pipes connecting those components (for example, see Patent Literature 1).

The above-mentioned integration enables the system to be downsized and also enables a length of the pipe to be decreased to reduce heat loss. In this manner, the efficiency of the fluid system can be improved.

CITATION LIST

Patent Literature

[PTL 1] JP 2009-540223 A

SUMMARY OF INVENTION

Technical Problem

In an elevator hoisting machine or other machines, in order to improve the safety and reduce a waiting time of an elevator user, improvement in responsiveness of a brake device is demanded. Meanwhile, in a brake device operated by a hydraulic or pneumatic pressure, after a pressure of the compressed fluid is adjusted to a usage pressure, pressure storage devices such as an accumulator and a tank and components such as compressed-fluid control valves are required to be connected by pipes.

In this case, as the length of the pipe is increased, pressure loss in the pipe is increased, and a time required for increasing a pressure of the compressed fluid in a brake cylinder to a necessary pressure is increased. As a result, reduction in responsiveness becomes a problem. Further, when the pressure loss is increased, there also arises a problem in that an operation time of a compressed-fluid production apparatus, for example, a compressor, is required to be increased.

Further, even when the length of the pipe is decreased, the pipe between the operation machine and the valve is not shortened. In a case of an operation machine of a type that obtains power by the compressed fluid, the responsiveness may not be improved.

The present invention has been made to solve the above-mentioned problems, and has an object to provide a brake device in which an entire path of the compressed fluid is decreased to improve the responsiveness.

Solution to Problem

In order to achieve the above-mentioned object, according to one embodiment of the present invention, there is provided a brake device, which is configured to perform braking and releasing of a disc by moving a rod having a lining at a leading end of the rod by a spring device, the brake device including: a pressure storage unit configured to store a compressed fluid; and a pressure control unit including a pressure-receiving piston mounted to the rod in a cylinder tube arranged adjacent to the pressure storage unit, the pressure control unit including a first inflow/outflow port, a second inflow/outflow port, a first control valve configured to control opening and closing of the first inflow/outflow port, and a second control valve configured to control opening and closing of the second inflow/outflow port, in which, when the disc is to be released, the first control valve is opened and the second control valve is closed to cause the compressed fluid in the pressure storage unit to pass through the first inflow/outflow port to flow into the pressure control unit, to thereby move the pressure-receiving piston to a position for the releasing, and in which, when the disc is to be braked, the first control valve is closed and the second control valve is opened to cause the compressed fluid that has flowed into the pressure control unit to pass through the second inflow/outflow port to be released to an atmosphere, to thereby return the pressure-receiving piston to a position for the braking.

Advantageous Effects of Invention

According to the present invention, the pressure control unit is arranged adjacent to the pressure storage unit, and the pressure control unit has two inflow/outflow ports for the compressed fluid and two control valves. The control valves are opened and closed to drive the pressure-receiving piston by the compressed fluid, thereby braking and releasing the disc. With this configuration, the entire path of the compressed fluid is decreased, and hence the responsiveness of the brake can be improved. Further, the volume of the compressed fluid can be reduced, and hence the operation time of the compressed-fluid production apparatus can be reduced.

BRIEF DESCRIPTION OF DRAWINGS

FIG. 12 is a sectional view for illustrating a brake device according to a fifth embodiment of the present invention.

FIG. 13 is a sectional view for illustrating a brake device according to a sixth embodiment of the present invention.

DESCRIPTION OF EMBODIMENTS

Now, a brake device according to each embodiment of the present invention is described in detail with reference to the drawings.

First Embodiment

Figure 1:
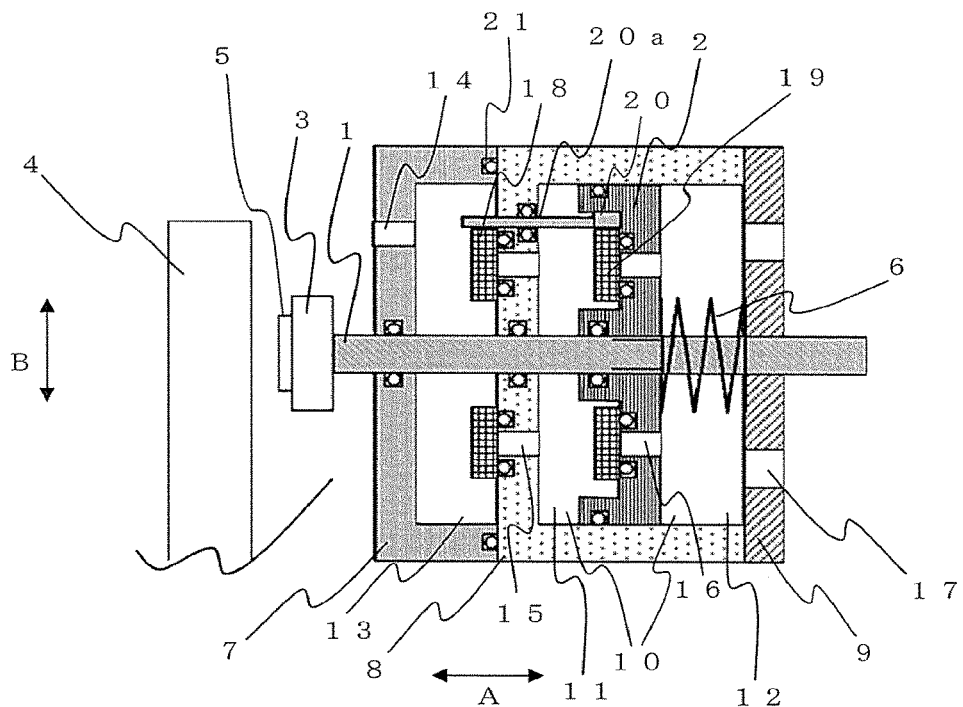
FIG. 1 is a sectional view for illustrating a brake device according to a first embodiment of the present invention.

A brake device according to a first embodiment of the present invention illustrated in FIG. 1 is used for an elevator hoisting machine or other machines. The brake device includes a rod 1, a pressure-receiving piston 2, a shoe 3, a lining 5, and a spring device 6. The rod 1 is movable in an axial direction. The pressure-receiving piston 2 is fixed to the rod 1 and is configured to receive a pneumatic pressure. The shoe 3 is mounted to a leading end portion of the rod 1. The lining 5 is mounted to the shoe 3 and is contactable to a disc 4 serving as a member to be contacted. The spring device 6 is configured to press the pressure-receiving piston 2 in a direction in which the lining 5 is pressed against the disc 4.

The brake device further includes a pressure storage container 7, a first cylinder tube 8, and a second cylinder tube 9. The pressure storage container 7 receives a compressed fluid supplied to the pressure storage container 7. The first cylinder tube 8 is arranged adjacent to the pressure storage container 7 and is configured to guide the pressure-receiving piston 2. The second cylinder tube 9 is mounted to a rear surface of the first cylinder tube 8 on an opposite side of the lining 5 with respect to the pressure-receiving piston 2. The first cylinder tube 8 and the second cylinder tube 9 construct one cylinder tube.

The pressure-receiving piston 2, the first cylinder tube 8, and the second cylinder tube 9 form a pressure control chamber 10. The pressure-receiving piston 2, the first cylinder tube 8, the second cylinder tube 9, and the pressure control chamber 10 construct a pressure control unit.

The pressure control chamber 10 includes a first pressure control chamber 11 and a second pressure control chamber 12. The first pressure control chamber 11 is a region on the same side as the lining 5 with respect to the pressure-receiving piston 2. The second pressure control chamber 12 is a region on the opposite side of the lining 5 with respect to the pressure-receiving piston 2. Further, the pressure storage container 7 and the first cylinder tube 8, which are adjacent to each other, form a pressure storage chamber 13. The pressure storage container 7 and the pressure storage chamber 13 construct a pressure storage unit.

In the pressure storage container 7, there is formed a pressure storage unit compressed-fluid inflow/outflow port 14 for allowing inflow and outflow of the compressed fluid between the pressure storage chamber 13 and the outside. The pressure storage unit compressed-fluid inflow/outflow port 14 may be located in an axial direction or in a circumferential direction. In this example, the axial direction refers to an axial direction of the rod 1, that is, an axial direction of the cylinder tube 8 as indicated by the arrow A of FIG. 1, and a radial direction refers to a radial direction of the rod 1 as indicated by the arrow B of FIG. 1. Further, the circumferential direction refers to a circumferential direction of the pressure storage container 7 or the cylinder tubes 8 and 9.

In the first cylinder tube 8, there are formed first compressed-fluid inflow/outflow ports 15 for allowing inflow and outflow of the compressed fluid between the pressure storage chamber 13 and the first pressure control chamber 11. In the pressure-receiving piston 2, there are formed second compressed-fluid inflow/outflow ports 16 for allowing inflow and outflow of the compressed fluid between the first pressure control chamber 11 and the second pressure control chamber 12. In the second cylinder tube 9, there are formed third compressed-fluid inflow/outflow ports 17. The number of the pressure storage unit compressed-fluid inflow/outflow port 14, the number of the first compressed-fluid inflow/outflow port 15, the number of the second compressed-fluid inflow/outflow port 16, and the number of the third compressed-fluid inflow/outflow port 17 may each be one or more than one.

On the pressure storage chamber 13 side of the compressed-fluid inflow/outflow ports 15, a first compressed-fluid control valve 18 for opening and closing the compressed-fluid inflow/outflow ports 15 is mounted. The first compressed-fluid control valve 18 may be mounted on the first pressure control chamber 11 side instead of the pressure storage chamber 13 side. Further, on the first pressure control chamber 11 side of the second compressed-fluid inflow/outflow ports 16, a second compressed-fluid control valve 19 for opening and closing the second compressed-fluid inflow/outflow port 16 is mounted. The second compressed-fluid control valve 19 may be mounted on the second pressure control chamber 12 side instead of the first pressure control chamber 11 side.

As a device for controlling the first compressed-fluid control valve 18 and the second compressed-fluid control valve 19, a combined mechanism of a motor 20 and a motor drive transmission portion 20a is provided. The motor 20 and the motor drive transmission portion 20a may be arranged separately for each of the first compressed-fluid control valve 18 and the second compressed-fluid control valve 19, or the first compressed-fluid control valve 18 and the second compressed-fluid control valve 19 may interlock with a combination of one motor 20 and one motor drive transmission portion 20a.

The spring device 6 is arranged so as to be engaged with the pressure-receiving piston 2 in the axial direction. The spring device 6 is constructed by one coil spring. The rod 1 is inserted through a center part of the coil spring so that the spring device 6 drives the rod 1 coupled to the pressure-receiving piston 2. Therefore, the spring device 6 presses the pressure-receiving piston 2 to the lining 5 side by its elastic force so that the rod 1 presses the lining 5 against the disc 4 for braking. When the spring device 6 is moved to the opposite side of the lining 5, the braking force against the disc 4 is cancelled.

Further, the brake device includes sealing members 21 respectively between the rod 1 and the pressure-receiving piston 2, between the rod 1 and the pressure storage container 7, between the rod 1 and the first cylinder tube 8, between the pressure storage container 7 and the first cylinder tube 8, between the pressure-receiving piston 2 and the first cylinder tube 8, between the first compressed-fluid control valve 18 and the first cylinder tube 8, between the second compressed-fluid control valve 19 and the pressure-receiving piston 2, and between the combination of the motor 20 and the motor drive transmission portion 20a and the first cylinder tube 8.

Figure 2:
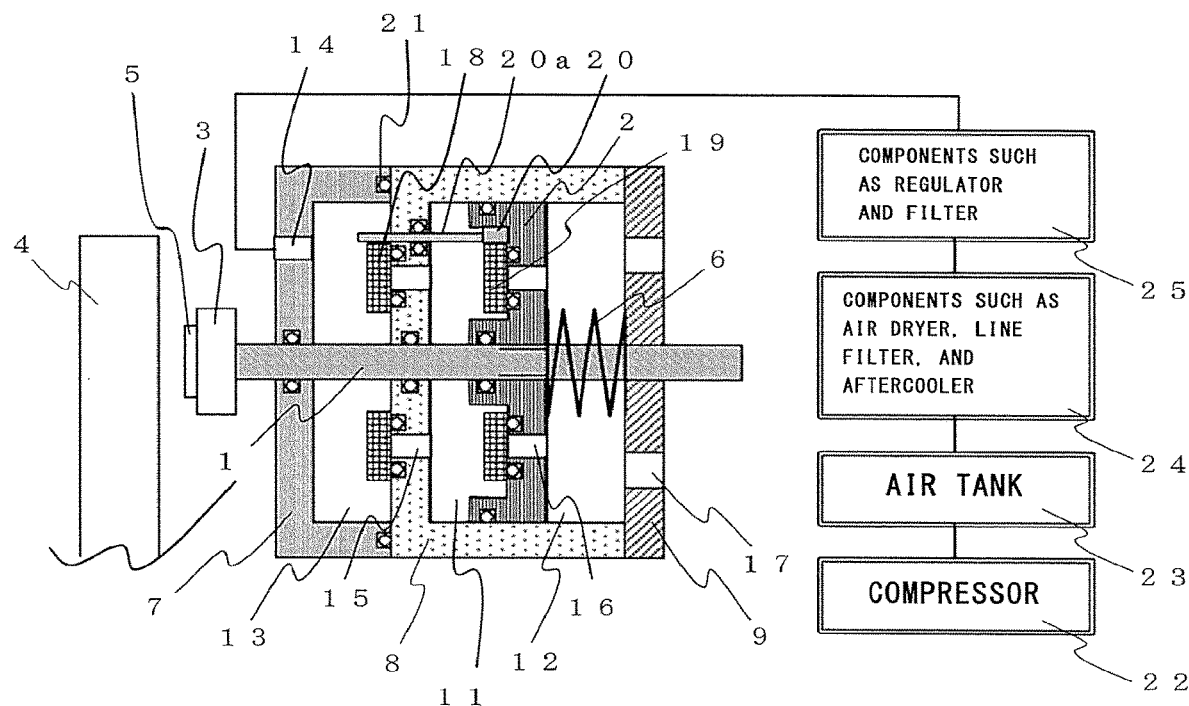
FIG. 2 is a diagram for illustrating a configuration in which peripheral devices are added to the brake device illustrated in FIG. 1.

FIG. 2 is an illustration of peripheral devices for driving the brake device of FIG. 1. A compressed fluid that is compressed by a compressor 22 is fed to the pressure storage unit inflow/outflow port 14 via an air tank 23, components 24 such as an air dryer, a line filter, and an aftercooler, and components 25 such as a regulator and a filter. A plurality of sets of those peripheral devices may be used for one brake device, or a plurality of brake devices may be driven by one set of those peripheral devices.

Next, various examples of the above-mentioned fluid control valves are described. The examples can be used in common in each embodiment of the present invention.

Example (1) of Fluid Control Valve

Figure 3:
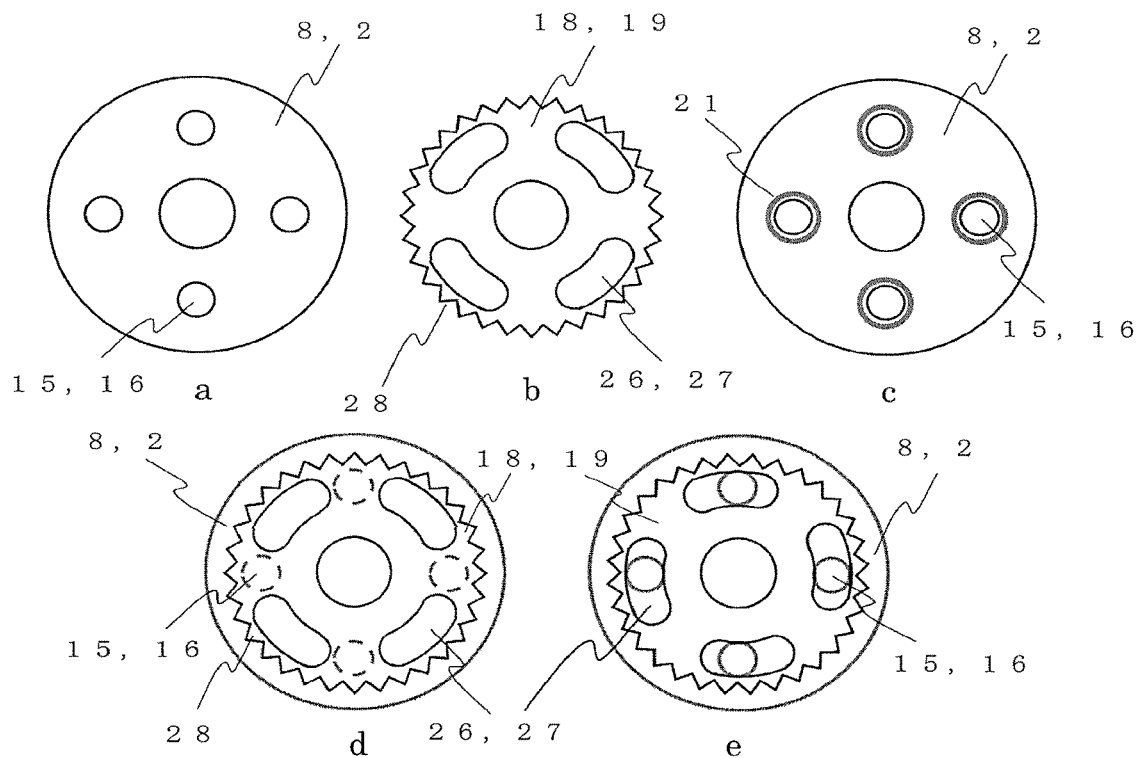
FIG. 3 are side views for illustrating Example (1) of a fluid control valve to be used in the brake device according to each embodiment of the present invention.

FIG. 3 are illustrations of Example (1) of the fluid control valve to be used in the brake device according to the present invention. FIG. 3 are views for illustrating the first cylinder tube 8 or the pressure-receiving piston 2, and the first compressed-fluid control valve 18 or the second compressed-fluid control valve 19 of the brake device of FIG. 1 as viewed from the lining 5 side in the axial direction. FIG. 3A is an illustration of the first cylinder tube 8 or the pressure-receiving piston 2. FIG. 3A is an illustration of an example in which four first compressed-fluid inflow/outflow ports 15 or four second compressed-fluid inflow/outflow ports 16 are formed in the first cylinder tube 8 or the pressure-receiving piston 2.

FIG. 3B is an illustration of the first compressed-fluid control valve 18 or the second compressed-fluid control valve 19. As illustrated in FIG. 3B, the first compressed-fluid control valve 18 or the second compressed-fluid control valve 19 has first compressed-fluid control valve interior inflow/outflow ports 26 or second compressed-fluid control valve interior inflow/outflow ports 27, which are holes for allowing inflow and outflow of the compressed fluid, and the outer periphery of the first compressed-fluid control valve 18 or the second compressed-fluid control valve 19 has a shape having gear-like grooves 28 for engagement with the motor drive transmission portion 20a.

In this case, the illustrated shape of the first compressed-fluid control valve 18 or the second compressed-fluid control valve 19 is merely an example, and the groove 28 may be formed on the inner peripheral side, or a shape merely having protrusions may be employed instead of the gear-like grooves 28. The first compressed-fluid control valve interior inflow/outflow ports 26 or the second compressed-fluid control valve interior inflow/outflow ports 27 may have any shape instead of a long hole shape as long as the compressed fluid can pass therethrough, for example, a circular shape and a rectangular shape.

Further, FIG. 3C is an illustration of an example of the sealing members 21, which are mounted to the first cylinder tube 8 and between the first cylinder tube 8 and the first compressed-fluid control valve 18 or to the pressure-receiving piston 2 and between the pressure-receiving piston 2 and the second compressed-fluid control valve 19. In a case where components of FIG. 3A and FIG. 3B are mounted adjacent to each other, FIG. 3D is an illustration of a state in which the compressed-fluid inflow/outflow ports 15 or 16 are closed, and FIG. 3E is an illustration of a state in which the compressed-fluid inflow/outflow ports 15 or 16 are not closed.

Example (2) of Fluid Control Valve

In the above-mentioned fluid control valve of Example (1), the holes are formed in the first compressed-fluid control valve 18 or the second compressed-fluid control valve 19 to form paths for allowing the compressed fluid to pass through the first compressed-fluid inflow/outflow ports 15 or the second compressed-fluid inflow/outflow ports 16.

Figure 4:
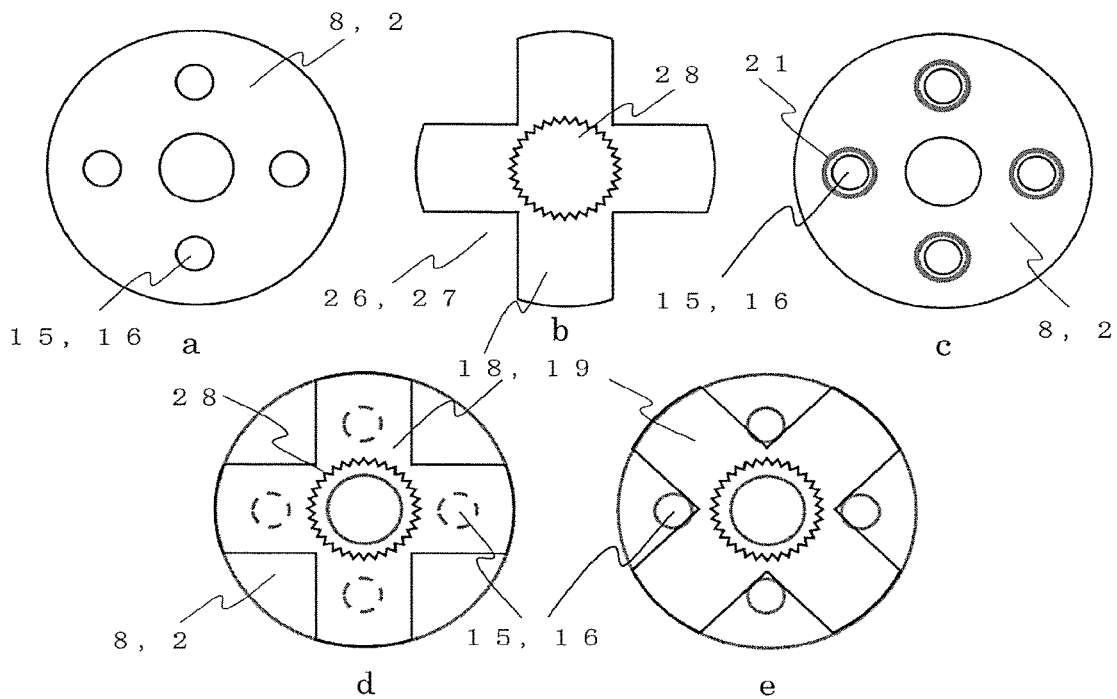
FIG. 4 are side views for illustrating Example (2) of the fluid control valve to be used in the brake device according to each embodiment of the present invention.

Meanwhile, in the fluid control valve of Example (2), as illustrated in FIG. 4, the grooves 28 are formed in the first compressed-fluid control valve 18 or the second compressed-fluid control valve 19 to form paths for allowing the compressed fluid to pass through the first compressed-fluid inflow/outflow ports 15 or the second compressed-fluid inflow/outflow ports 16.

FIG. 4 are views for illustrating the first cylinder tube 8 or the pressure-receiving piston 2, and the first compressed-fluid control valve 18 or the second compressed-fluid control valve 19 of the brake device illustrated in FIG. 1 and FIG. 2 as viewed from the front side of the lining 5. FIG. 4A is an illustration of the first cylinder tube 8 or the pressure-receiving piston 2. FIG. 4A is an illustration of an example in which four first compressed-fluid inflow/outflow ports 15 or four second compressed-fluid inflow/outflow ports 16 are formed in the first cylinder tube 8 or the pressure-receiving piston 2. FIG. 4B is an illustration of the cross-shaped first compressed-fluid control valve 18 or the cross-shaped second compressed-fluid control valve 19. As illustrated in FIG. 4B, the first compressed-fluid control valve 18 or the second compressed-fluid control valve 19 has the first compressed-fluid control valve interior inflow/outflow ports 26 or the second compressed-fluid control valve interior inflow/outflow ports 27 for allowing inflow and outflow of the compressed fluid, and the inner periphery of the first compressed-fluid control valve 18 or the second compressed-fluid control valve 19 has a shape having the gear-like grooves 28 for engagement with the motor drive transmission portion 20a.

In this case, the shape of the first compressed-fluid control valve 18 or the second compressed-fluid control valve 19 is merely an example, and the grooves 28 may be formed on the outer peripheral side, or a shape merely having protrusions may be employed instead of the gear-like grooves 28. The first compressed-fluid control valve interior inflow/outflow ports 26 or the second compressed-fluid control valve interior inflow/outflow ports 27 may have any shape as long as the compressed fluid can pass therethrough.

Further, FIG. 4C is an illustration of an example of the sealing members 21, which are mounted to the first cylinder tube 8 and between the first cylinder tube 8 and the first compressed-fluid control valve 18 or to the pressure-receiving piston 2 and between the pressure-receiving piston 2 and the second compressed-fluid control valve 19.

In a case where components of FIG. 4A and FIG. 4B are mounted in an overlapping manner, FIG. 4D is an illustration of a state in which the compressed-fluid inflow/outflow ports are closed, and FIG. 4E is an illustration of a state in which the compressed-fluid inflow/outflow ports are not closed. The first compressed-fluid control valve 18 or the second compressed-fluid control valve 19 is rotated by the motor 20 and the motor drive transmission portion 20a that are engaged with the groove 28, to thereby open and close the compressed-fluid inflow/outflow ports 15 or 16 as illustrated in FIG. 4D and FIG. 4E.

Other configurations are similar to those of Example (1) described above.

In this manner, the processing of the first compressed-fluid control valve 18 and the second compressed-fluid control valve 19 is facilitated. Thus, the availability of the components is increased, and the productivity and the maintenance performance can be improved.

Example (3) of Fluid Control Valve

In the above-mentioned fluid control valve of Example (1), the first compressed-fluid control valve 18 or the second compressed-fluid control valve 19 is rotated with respect to the first cylinder tube 8 or the pressure-receiving piston 2 by the motor 20 and the motor drive transmission portion 20a to form paths for allowing the compressed fluid to pass through the first compressed-fluid inflow/outflow ports 15 or the second compressed-fluid inflow/outflow ports 16.

In this case, a rotational force is applied under a state in which the sealing members 21 are pressed against the first cylinder tube 8 or the pressure-receiving piston 2 by the first compressed-fluid control valve 18 or the second compressed-fluid control valve 19, and hence a load applied to the sealing members 21 is increased, and thus the sealing members 21 may be liable to be worn. Therefore, the maintenance frequency may be increased.

Figure 5:
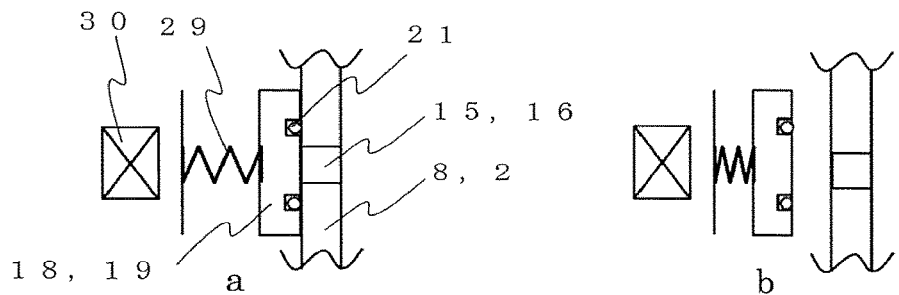
FIG. 5 are side views for illustrating Example (3) of the fluid control valve to be used in the brake device according to each embodiment of the present invention.

In view of this, in the fluid control valve of Example (3), as illustrated in FIG. 5, the first compressed-fluid control valve 18 or the second compressed-fluid control valve 19 is separated away from the first cylinder tube 8 or the pressure-receiving piston 2 in the axial direction. In this manner, a path for allowing the compressed fluid to pass through the first compressed-fluid inflow/outflow port 15 and the second compressed-fluid inflow/outflow port 16 is formed. The state in which the sealing member 21 is pressed against the first cylinder tube 8 or the pressure-receiving piston 2 by the first compressed-fluid control valve 18 or the second compressed-fluid control valve 19 is maintained or released for operation.

First, as illustrated in FIG. 5A, the first compressed-fluid control valve 18 or the second compressed-fluid control valve 19 is pressed against the first cylinder tube 8 or the pressure-receiving piston 2 by a valve spring device 29. The sealing member 21 is mounted between the first compressed-fluid control valve 18 or the second compressed-fluid control valve 19 and the first cylinder tube 8 or the pressure-receiving piston 2, and thus the compressed fluid does not pass through the first compressed-fluid inflow/outflow port 15 or the second compressed-fluid inflow/outflow port 16.

When the compressed fluid is to be caused to pass through the first compressed-fluid inflow/outflow port 15 or the second compressed-fluid inflow/outflow port 16, as illustrated in FIG. 5B, a valve activation coil 30 is activated to attract the first compressed-fluid control valve 18 or the second compressed-fluid control valve 19. Thus, the spring force of the valve spring device 29 is cancelled to shrink the valve spring device 29, to thereby separate the first compressed-fluid control valve 18 or the second compressed-fluid control valve 19 away from the first cylinder tube 8 or the pressure-receiving piston 2. In this manner, a path for allowing the compressed fluid to pass through the first compressed-fluid inflow/outflow port 15 or the second compressed-fluid inflow/outflow port 16 is formed.

Other configurations are similar to those of Example (1) described above.

As described above, with the fluid control valve of Example (3), the wearing of the sealing member 21 can be reduced, and the reliability of the device can be improved.

Example (4) of Fluid Control Valve

In the above-mentioned fluid control valve of Example (3), the first compressed-fluid control valve 18 or the second compressed-fluid control valve 19 is moved in the axial direction by the valve spring device 29 and the valve activation coil 30 so that a flat surface of the first compressed-fluid control valve 18 or the second compressed-fluid control valve 19 is brought into contact with or separated away from the first cylinder tube 8 or the pressure-receiving piston 2, to thereby control the inflow or the outflow of the compressed fluid through the first compressed-fluid inflow/outflow port 15 or the second compressed-fluid inflow/outflow port 16. Therefore, an interposition portion of the sealing member 21 is wider than the compressed-fluid inflow/outflow port, and hence leakage of the compressed fluid may be liable to occur.

Figure 6:
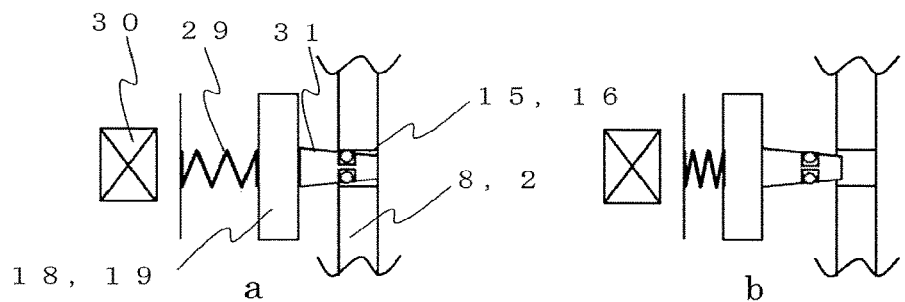
FIG. 6 are side views for illustrating Example (4) of the fluid control valve to be used in the brake device according to each embodiment of the present invention.

In view of this, in the fluid control valve of Example (4), as illustrated in FIG. 6, a valve protrusion 31 with the sealing member 21, which is mounted to the first compressed-fluid control valve 18 or the second compressed-fluid control valve 19, is moved in the axial direction so that the valve protrusion 31 comes in and out of the first compressed-fluid inflow/outflow port 15 or the second compressed-fluid inflow/outflow port 16. In this manner, the inflow and the outflow of the compressed fluid through the first compressed-fluid inflow/outflow port 15 or the second compressed-fluid inflow/outflow port 16 are controlled. With this configuration, the valve protrusion 31 having the sealing member 21 mounted thereon is inserted into the compressed-fluid inflow/outflow port, and hence the leakage of the compressed fluid is less liable to occur.

First, as illustrated in FIG. 6A, the first compressed-fluid control valve 18 or the second compressed-fluid control valve 19 is pressed against the first cylinder tube 8 or the pressure-receiving piston 2 by the valve spring device 29, and the valve protrusion 31 with the sealing member 21, which is mounted to the first compressed-fluid control valve 18 or the second compressed-fluid control valve 19, is inserted into the first compressed-fluid inflow/outflow port 15 or the second compressed-fluid inflow/outflow port 16. In this case, the compressed fluid does not pass through the first compressed-fluid inflow/outflow port 15 or the second compressed-fluid inflow/outflow port 16.

When the compressed fluid is to be caused to pass through the first compressed-fluid inflow/outflow port 15 or the second compressed-fluid inflow/outflow port 16, as illustrated in FIG. 6B, the valve activation coil 30 is activated. In this manner, the first compressed-fluid control valve 18 or the second compressed-fluid control valve 19 is attracted. Thus, the spring force of the valve spring device 29 is cancelled to shrink the valve spring device 29, to thereby separate the first compressed-fluid control valve 18 or the second compressed-fluid control valve 19 away from the first cylinder tube 8 or the pressure-receiving piston 2. In this manner, the valve protrusion 31 with the sealing member 21, which is mounted to the first compressed-fluid control valve 18 or the second compressed-fluid control valve 19, is removed from the inside of the first compressed-fluid inflow/outflow port 15 or the second compressed-fluid inflow/outflow port 16, and thus a path for allowing the compressed fluid to pass through the first compressed-fluid inflow/outflow port 15 or the second compressed-fluid inflow/outflow port 16 is formed.

Other configurations are similar to those of Example (1) described above.

As described above, according to Example (4), the leakage of the compressed fluid in the compressed-fluid control valve can be reduced.

Example (5) of Fluid Control Valve

In the above-mentioned fluid control valve of Example (1), the first compressed-fluid control valve 18 or the second compressed-fluid control valve 19 is rotated with respect to the first cylinder tube 8 or the pressure-receiving piston 2 by the motor 20 and the motor drive transmission portion 20a so as to form paths for allowing the compressed fluid to pass through the first compressed-fluid inflow/outflow ports 15 or the second compressed-fluid inflow/outflow ports 16.

Figure 7:
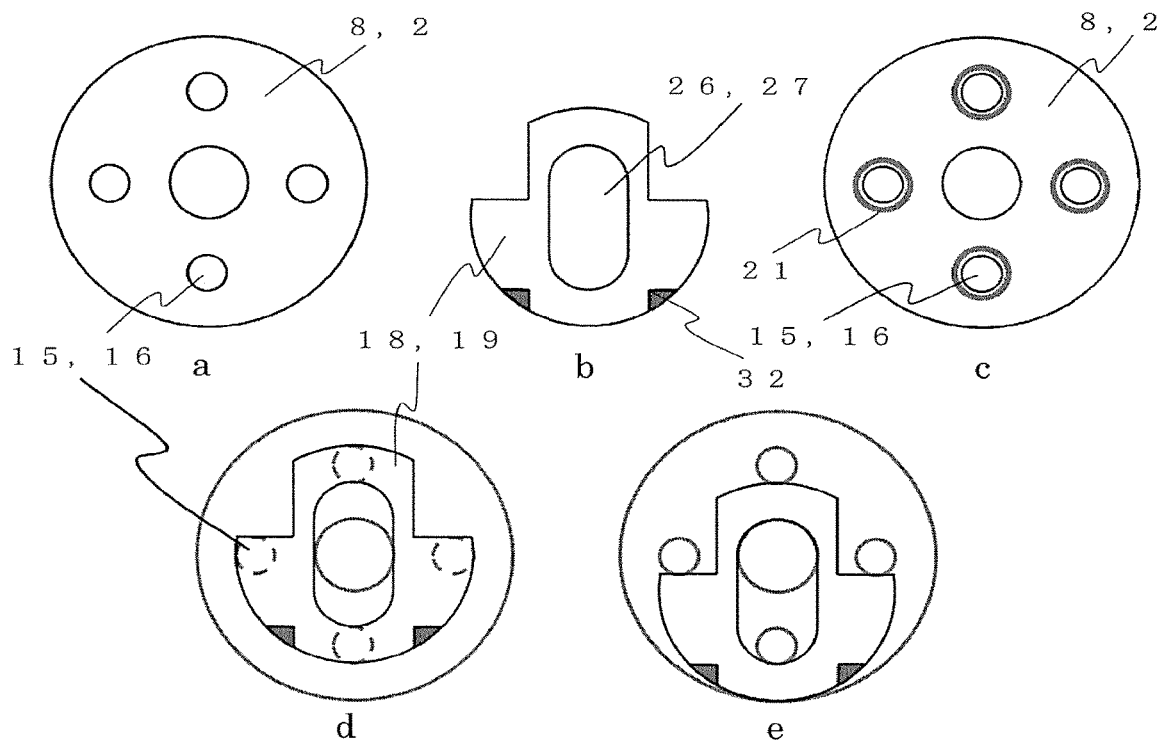
FIG. 7 are side views for illustrating Example (5) of the fluid control valve to be used in the brake device according to each embodiment of the present invention.

Meanwhile, in the fluid control valve of Example (5), as illustrated in FIG. 7, a valve rocking device 32 mounted to the first compressed-fluid control valve 18 or the second compressed-fluid control valve 19 causes the first compressed-fluid control valve 18 or the second compressed-fluid control valve 19 to rock with respect to the first cylinder tube 8 or the pressure-receiving piston 2 to form paths for allowing the compressed fluid to pass through the first compressed-fluid inflow/outflow ports 15 or the second compressed-fluid inflow/outflow ports 16. As the valve rocking device 32, a coil and a biasing spring, a motor and a cam, a piezoelectric element, a magnetostrictive element, or other elements can be used.

FIG. 7 are views for illustrating the first cylinder tube 8 or the pressure-receiving piston 2, and the first compressed-fluid control valve 18 or the second compressed-fluid control valve 19 as viewed from the front side of the lining 5. FIG. 7A is an illustration of the first cylinder tube 8 or the pressure-receiving piston 2, and FIG. 7B is an illustration of the first compressed-fluid control valve 18 or the second compressed-fluid control valve 19. FIG. 7A is an illustration of an example in which four first compressed-fluid inflow/outflow ports 15 or four second compressed-fluid inflow/outflow ports 16 are formed in the first cylinder tube 8 or the pressure-receiving piston 2.

As illustrated in FIG. 7B, the first compressed-fluid control valve 18 or the second compressed-fluid control valve 19 has the first compressed-fluid control valve interior inflow/outflow port 26 or the second compressed-fluid control valve interior inflow/outflow port 27 for allowing inflow and outflow of the compressed fluid, and the outer periphery of the first compressed-fluid control valve 18 or the second compressed-fluid control valve 19 has a shape for allowing the valve rocking device 32 to be mounted thereon. In this case, the shape of the first compressed-fluid control valve 18 or the second compressed-fluid control valve 19 is merely an example, and the valve rocking device 32 may be provided on the inner peripheral side or may be built into the first compressed-fluid control valve 18 or the second compressed-fluid control valve 19.

Further, the first compressed-fluid control valve interior inflow/outflow port 26 or the second compressed-fluid control valve interior inflow/outflow port 27 may have any shape as long as the compressed fluid can pass therethrough. Further, FIG. 7C is an illustration of an example of the sealing members 21 mounted to the first cylinder tube 8 and between the first cylinder tube 8 and the first compressed-fluid control valve 18 or to the pressure-receiving piston 2 and between the pressure-receiving piston 2 and the second compressed-fluid control valve 19.

In a case where components of FIG. 7A and FIG. 7B are mounted in an overlapping manner, FIG. 7D is an illustration of a state in which the compressed-fluid inflow/outflow ports are closed, and FIG. 7E is an illustration of a state in which the compressed-fluid inflow/outflow ports are not closed. The first compressed-fluid control valve 18 or the second compressed-fluid control valve 19 is rocked by the valve rocking device 32 to open and close the compressed-fluid inflow/outflow ports as illustrated in FIG. 7D and FIG. 7E.

Other configurations are similar to those of Example (1).

Next, referring back to FIG. 1 and FIG. 2, the operation of the brake device according to the first embodiment in the case of Example (1) of the fluid control valve is described below. Needless to say, similar operations are performed also in the cases of the fluid control valves (2) to (5).

First, under a state in which the compressed fluid is not fed to the first pressure control chamber 11, the lining 5 is pressed against the disc 4 by the elastic force of the spring device 6. With this, the rotation of the disc 4 is braked. Further, the second pressure control chamber 12 and the inflow/outflow ports 16 are connected to the atmosphere through the third compressed-fluid inflow/outflow ports 17, and thus are maintained to the atmospheric pressure. In this regard, the inflow/outflow ports 16 and 17 construct one inflow/outflow port.

As illustrated in FIG. 2, the compressed fluid compressed by the compressor 22 is fed via the air tank 23, the components 24 such as the air dryer, the line filter, and the aftercooler, and the components 25 such as the regulator and the filter to pass through the pressure storage unit compressed-fluid inflow/outflow port 14 to be stored in the pressure storage chamber 13. At this time, the first compressed-fluid control valve 18 is rotated by the motor 20 and the motor drive transmission portion 20a so that the first compressed-fluid control valve interior inflow/outflow ports 26 are shifted from the first compressed-fluid inflow/outflow ports 15 as illustrated in FIG. 3D, for example. In this manner, the inflow and the outflow of the compressed fluid from the pressure storage chamber 13 to the first pressure control chamber 11 are interrupted.

When the disc 4 is to be released, the first compressed-fluid control valve 18 is rotated by the motor 20 and the motor drive transmission portion 20a so that the first compressed-fluid control valve interior inflow/outflow ports 26 are positioned so as to overlap with the first compressed-fluid inflow/outflow ports 15 as illustrated in FIG. 3E, for example. Thus, the inflow and the outflow of the compressed fluid from the pressure storage chamber 13 to the first pressure control chamber 11 are allowed.

At this time, the second compressed-fluid control valve 19 is rotated by the motor 20 and the motor drive transmission portion 20a so that the second compressed-fluid control valve interior inflow/outflow ports 27 are positioned so as to be shifted from the second compressed-fluid inflow/outflow ports 16 as illustrated in FIG. 3D. Therefore, the inflow and the outflow of the compressed fluid from the first pressure control chamber 11 to the second pressure control chamber 12 are interrupted.

The compressed fluid of 0.2 MPa or more is supplied to the first pressure control chamber 11 to apply a force of the compressed fluid, which is larger than the elastic force of the spring device 6, to the pressure-receiving piston 2. In this manner, the rod 1 is moved in a direction in which the spring device 6 is shrunk. As a result, the lining 5 is separated away from the disc 4, and the disc 4 is released.

When the disc 4 is to be braked, the second compressed-fluid control valve 19 is rotated by the motor 20 and the motor drive transmission portion 20a so that the second compressed-fluid control valve interior inflow/outflow ports 27 are positioned with respect to the second compressed-fluid inflow/outflow ports 16 as illustrated in FIG. 3E. In this manner, the inflow and the outflow of the compressed fluid from the first pressure control chamber 11 to the second pressure control chamber 12 are allowed, and the compressed fluid is released to the atmosphere through the third compressed-fluid inflow/outflow port 17.

At this time, the first compressed-fluid control valve 18 is rotated by the motor 20 and the motor drive transmission portion 20a so that the first compressed-fluid control valve interior inflow/outflow ports 26 are positioned so as to overlap with the first compressed-fluid inflow/outflow ports 15 as illustrated in FIG. 3D. Thus, the inflow and the outflow of the compressed fluid from the pressure storage chamber 13 to the first pressure control chamber 11 are interrupted.

A final end of the pressure-receiving piston 2 when the disc 4 is released may be a point at which the elastic force of the spring device 6 and the force of the compressed fluid are balanced, or a point at which the pressure-receiving piston 2 and the second cylinder tube 9 are brought into contact with each other.

The pressure-receiving piston 2 and the rod 1 are connected to each other by, for example, thread fastening, and hence rotation of the rod 1 in the circumferential direction causes the rod 1 to move in the axial direction with respect to the first cylinder tube 8 and the second cylinder tube 9. In this manner, the lining 5 is moved in the axial direction to adjust a distance between the lining 5 and the disc 4.

In the first embodiment, the pressure-receiving piston 2 is threadedly fixed to the rod 1, but the pressure-receiving piston 2 may be integrated with the rod 1. Further, the pressure storage container 7 may be mounted to the first cylinder tube 8 through intermediation of the sealing member 21, or may be, for example, welded and joined to the first cylinder tube 8.

As described above, according to the brake device of the first embodiment of the present invention, the pressure storage unit including the pressure storage container 7 and the pressure storage chamber 13 is arranged adjacent to and integrated with the first cylinder tube 8 through intermediation of the first compressed-fluid control valve 18 and the first compressed-fluid inflow/outflow port 15. In this manner, the compressed-fluid path between the pressure-receiving piston 2 in the first cylinder tube 8 and the pressure storage unit is shortened. Thus, the responsiveness of the rod 1 connected to the pressure-receiving piston 2 is improved, and hence the responsiveness of the brake can be improved.

In addition, the compressed-fluid path can be shortened, and hence the volume of the compressed fluid flowing through the entire brake device is reduced. Thus, the pressure loss in the compressed-fluid path is reduced, and the operation time of the compressed-fluid production apparatus, for example, the compressor 22, can be reduced.

Second Embodiment

In the above-mentioned first embodiment, the pressure storage unit including the pressure storage container 7 and the pressure storage chamber 13 is arranged adjacent to and integrated with the first cylinder tube 8 in the axial direction. The cylinder tube having the integrated pressure storage container 7 as described above may be increased in the entire weight, and thus the assembly performance and the maintenance performance may be degraded.

Figure 8:
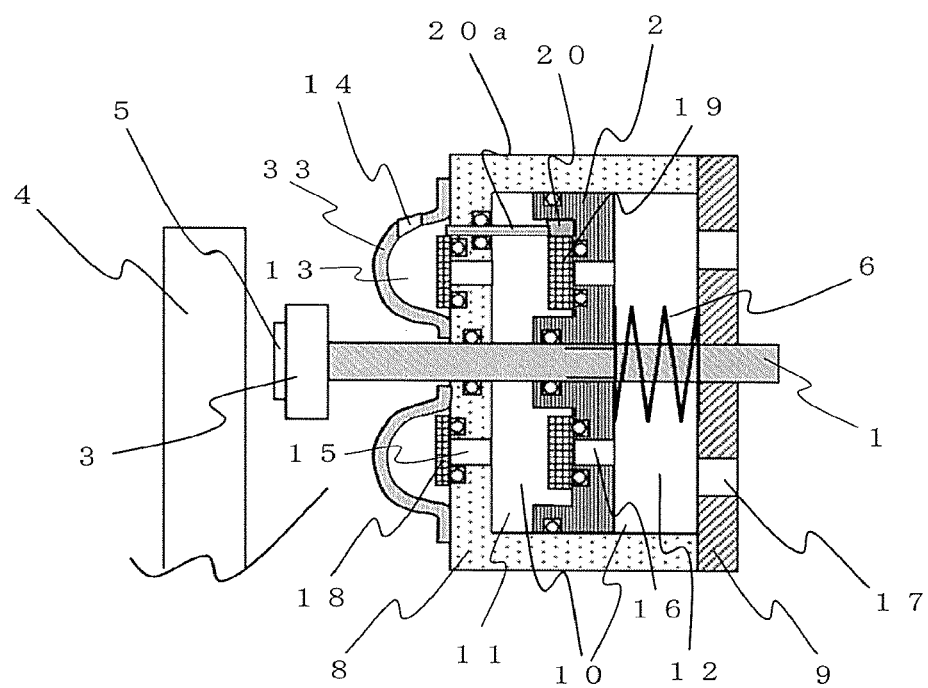
FIG. 8 is a sectional view for illustrating a brake device according to a second embodiment of the present invention.

In view of this, in a brake device according to a second embodiment of the present invention, as illustrated in FIG. 8, a diaphragm 33 is swelled in the axial direction and mounted annularly except for a part of the rod 1 so that the pressure storage chamber 13 is arranged adjacent to the cylinder tube 8. The compressed-fluid inflow/outflow port 14 is formed in the diaphragm 33. In this case, the diaphragm 33 is a membranous object that is made of rubber, resin, metal, or other materials and can store the compressed fluid of 0.2 MPa or more.

Other configurations are similar to those of the above-mentioned first embodiment.

As described above, according to the brake device of the second embodiment, the pressure storage chamber 13 is formed by the diaphragm 33. In this manner, the weight can be reduced, and the assembly performance and the maintenance performance can be improved.

Third Embodiment

In the above-mentioned first embodiment, the pressure storage container 7 is mounted in the axial direction with respect to the pressure-receiving piston 2, and is arranged adjacent to and integrated with the cylinder.

Figure 9:
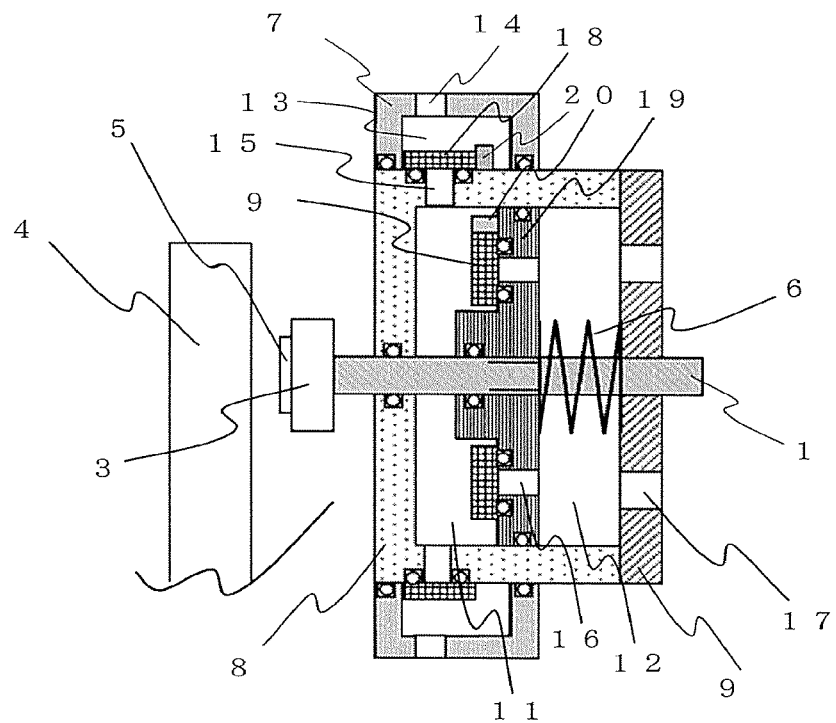
FIG. 9 is a sectional view for illustrating a brake device according to a third embodiment of the present invention.

Meanwhile, in a brake device according to a third embodiment of the present invention, as illustrated in FIG. 9, the pressure storage container 7 is mounted adjacent to the first cylinder tube 8 on a circumferential surface thereof to be integrated with the cylinder tube 8. In this case, the first compressed-fluid inflow/outflow ports 15 are formed in the circumferential surface of the first cylinder tube 8 so as to be connected to the pressure storage chamber 13 of the pressure storage container 7, and the first compressed-fluid control valve 18 and the motor 20 are mounted on the upper side of the first compressed-fluid inflow/outflow ports 15.

Figure 10:
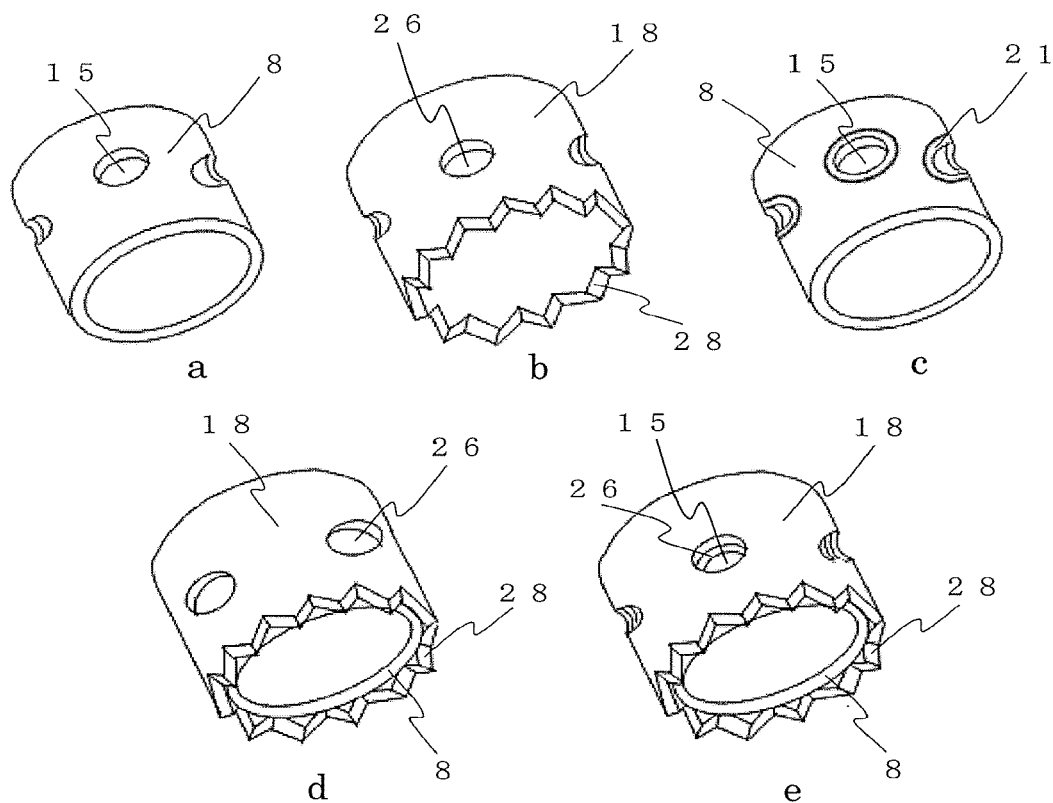
FIG. 10 are perspective views for illustrating a structure of coupling a cylinder tube and the fluid control valve in the brake device illustrated in FIG. 9.

FIG. 10 are views for illustrating the first cylinder tube 8 and the first compressed-fluid control valve 18 of the brake device of FIG. 9 as viewed from an oblique direction. Among FIG. 10, FIG. 10A is an illustration of the first cylinder tube 8, and is an illustration of an example in which four first compressed-fluid inflow/outflow ports 15 are formed in the first cylinder tube 8. FIG. 10B is an illustration of the first compressed-fluid control valve 18. The first compressed-fluid control valve 18 has the grooves 28 for driving the first compressed-fluid control valve 18 in order to open and close the first compressed-fluid control valve interior inflow/outflow ports 15, which are holes for allowing inflow and outflow of the compressed fluid, with use of the motor (not shown).

In this case, the shape of the first compressed-fluid control valve 18 is merely an example, and a shape merely having protrusions may be employed instead of the gear-like groove 28. The first compressed-fluid control valve interior inflow/outflow ports 26 may have any shape as long as the compressed fluid can pass therethrough.

Further, FIG. 10C is an illustration of an example of the sealing members 21 mounted to the first cylinder tube 8 and between the first cylinder tube 8 and the first compressed-fluid control valve 18.

In a case where components of FIG. 10A and FIG. 10B are mounted in an overlapping manner, FIG. 10D is an illustration of a state in which the compressed-fluid inflow/outflow ports are closed, and FIG. 10E is an illustration of a state in which the compressed-fluid inflow/outflow ports are not closed. The first compressed-fluid control valve 18 is rotated by the motor 20 to open and close the compressed-fluid inflow/outflow ports 15 as illustrated in FIG. 10D and FIG. 10E.

Other configurations are similar to those of the above-mentioned first embodiment.

As described above, according to the brake device of the third embodiment, an axial length of the brake device can be reduced, and hence a thinner cylinder tube can be obtained.

Fourth Embodiment

In the above-mentioned first embodiment, the pressure storage container 7 is mounted on the lining 5 side, that is, on the disc 4 side of the first cylinder tube 8 in the axial direction. That is, when the compressor 22 or the like illustrated in FIG. 2 is piped to the pressure storage unit compressed-fluid inflow/outflow port 14, components such as the disc 4, the lining 5, and the shoe 3 are mounted in the vicinity, and thus the assembly performance and the maintenance performance may be degraded.

Figure 11:
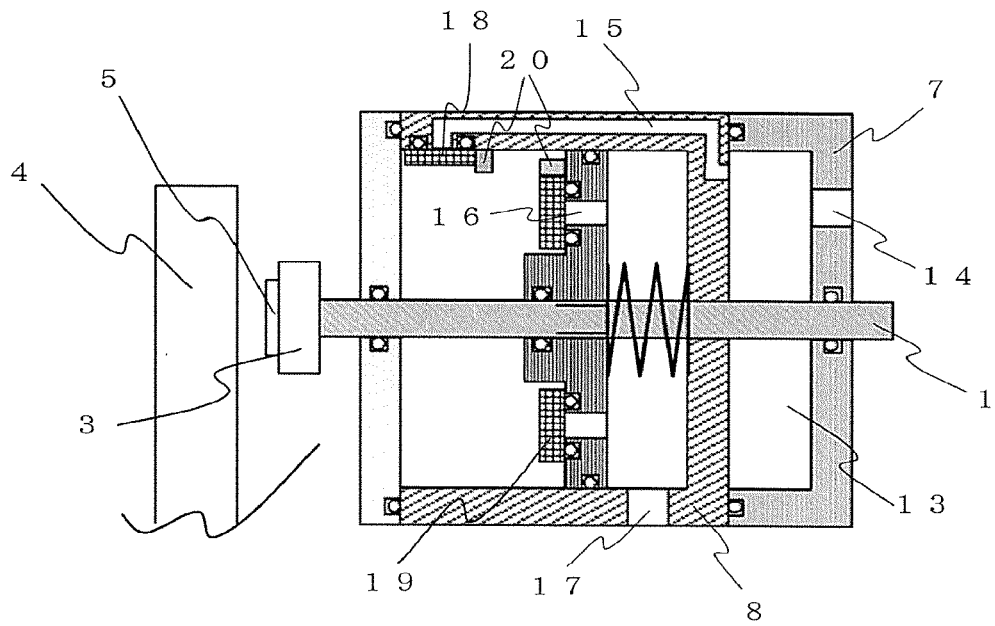
FIG. 11 is a sectional view for illustrating a brake device according to a fourth embodiment of the present invention.
Figure 1:
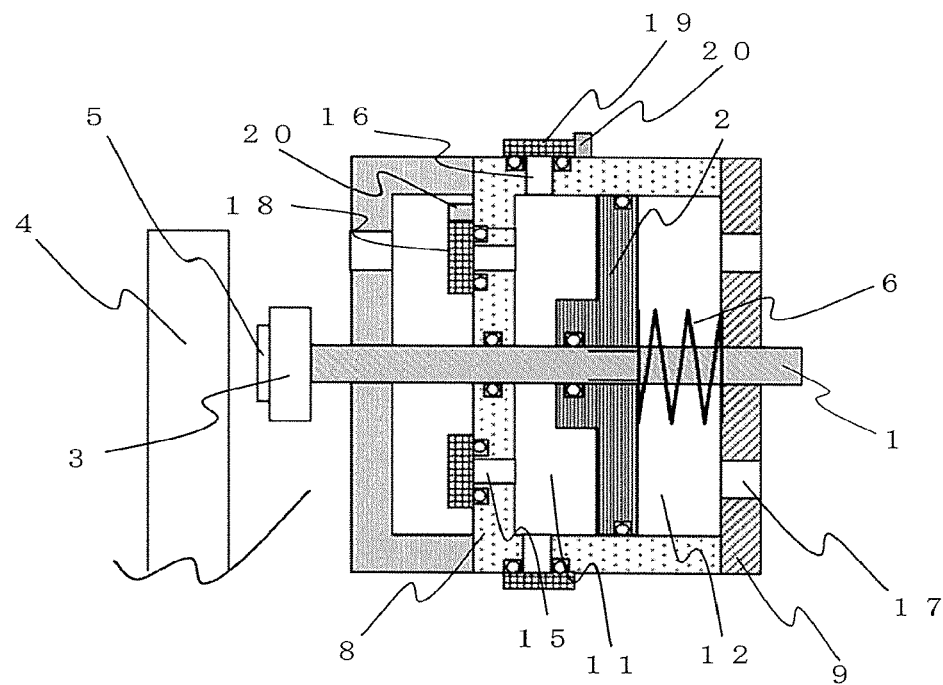
Figure 1:
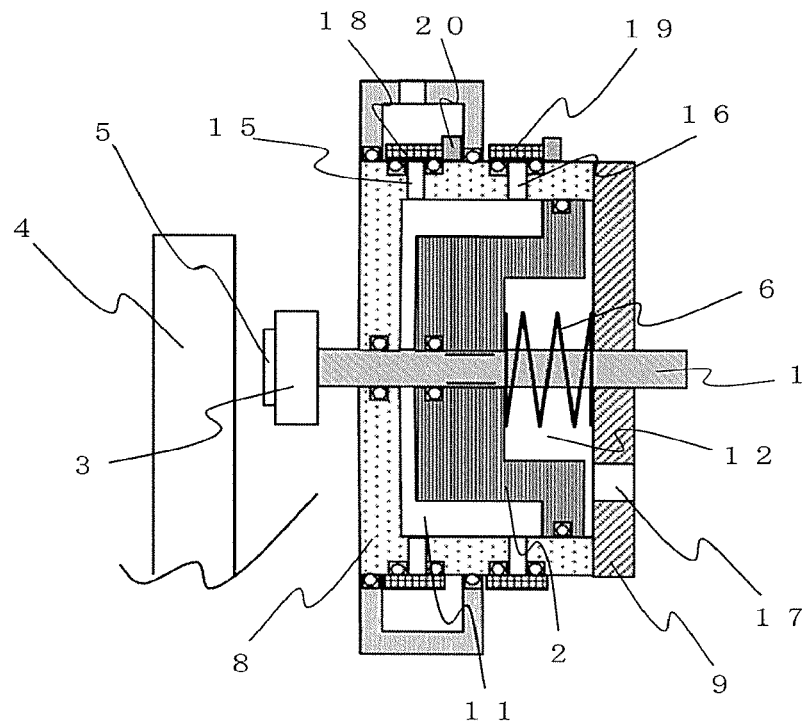

In view of this, in a brake device according to a fourth embodiment of the present invention, as illustrated in FIG. 11, the pressure storage container 7 is mounted on the rear-portion side of the first cylinder tube 8 in the axial direction. Further, the first compressed-fluid inflow/outflow port 15 is formed so as to pass through a circumferential tubular body of the first cylinder tube 8. An inlet of the first compressed-fluid inflow/outflow port 15 is connected to the pressure storage chamber 13, and an outlet thereof is connected to a space between the front portion of the first cylinder tube 8 and the pressure-receiving piston 2. The first compressed-fluid control valve 18 is mounted to the outlet. The third compressed-fluid inflow/outflow port 17 is formed in the circumferential surface of the first cylinder tube 8 so as to connect the space between the rear portion of the first cylinder tube 8 and the pressure-receiving piston 2 to the atmosphere. The spring device 6 is supported by the rear portion of the cylinder tube 8.

In this case, the number of the first compressed-fluid inflow/outflow port 15 and the number of the third compressed-fluid inflow/outflow port 17 may each be one or more than one.

Other configurations are similar to those of the above-mentioned first embodiment.

As described above, according to the brake device of the fourth embodiment, the assembly performance and the maintenance performance can be improved.

Fifth Embodiment

In the above-mentioned first embodiment and second embodiment, the second compressed-fluid inflow/outflow ports 16 are formed in the pressure-receiving piston 2. Further, the pressure-receiving piston 2 is moved, and hence the second compressed-fluid control valve 19, and the motor 20 and the motor drive transmission portion 20a are required to move in association with the pressure-receiving piston 2. Thus, the piping becomes complicated. Further, the second compressed-fluid control valve 19 is mounted in the pressure control chamber 10, and hence the assembly performance and the maintenance performance may be degraded.

In view of this, in a brake device according to a fifth embodiment of the present invention, as illustrated in FIG. 12, the second compressed-fluid inflow/outflow ports 16 are formed in the circumferential surface of the first cylinder tube 8, and the second compressed-fluid control valve 19 and the motor 20 are mounted to the second compressed-fluid inflow/outflow ports 16.

This configuration may be similarly applied to the second embodiment illustrated in FIG. 8.

Other configurations are similar to those of the above-mentioned first embodiment and second embodiment.

As described above, according to the brake device of the fifth embodiment, the assembly performance and the maintenance performance can be improved.

Sixth Embodiment

In the above-mentioned third embodiment, as illustrated in FIG. 9, the second compressed-fluid inflow/outflow ports 16 are still formed in the pressure-receiving piston 2, and thus the piping becomes complicated. Further, the second compressed-fluid control valve 19 is mounted in the pressure control chamber 10, and hence the assembly performance and the maintenance performance may be degraded.

In view of this, in a brake device according to a sixth embodiment of the present invention, as illustrated in FIG. 13, the second compressed-fluid inflow/outflow port 16 is also formed in the circumferential surface of the first cylinder tube 8 so as to be connected to the pressure storage chamber 13. The second compressed-fluid control valve 19 and the motor 20 are mounted to the second compressed-fluid inflow/outflow ports 16. Further, the spring device 6 mounted in the axial direction between the pressure-receiving piston 2 and the second cylinder tube 9 is received in a recessed portion formed in the pressure-receiving piston 2. In this case, the pressure-receiving piston 2 is not required to have a hole for receiving the spring device 6 similarly to the above-mentioned first embodiment.

Other configurations are similar to those of the above-mentioned third embodiment.

As described above, according to the brake device of the sixth embodiment, the assembly performance and the maintenance performance can be improved.

Seventh Embodiment

In the above-mentioned first embodiment, the pressure storage container 7 is mounted in the axial direction with respect to the pressure-receiving piston 2 so as to be integrated with the cylinder tube 8. In the case of this structure, as compared to the case in which the pressure storage container 7 is not integrated with the cylinder tube 8, the axial length of the brake device is required to be increased in order to increase the volume of the pressure storage chamber 13.

Figure 14:
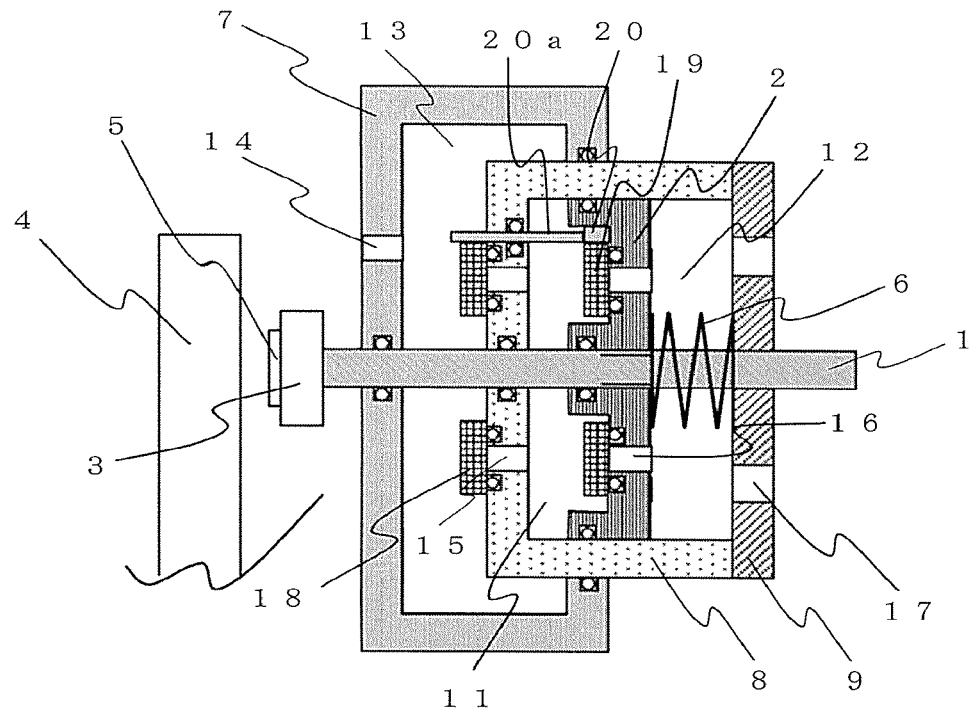
FIG. 14 is a sectional view for illustrating a brake device according to a seventh embodiment of the present invention.

In view of this, in a brake device according to a seventh embodiment of the present invention, as illustrated in FIG. 14, the pressure storage container 7 is arranged adjacent to the first cylinder tube 8 in a shape in which the pressure storage container 7 extends in the axial direction and the radial direction.

In this case, the first compressed-fluid inflow/outflow ports 15 and the first compressed-fluid control valve 18 may be provided in the axial direction with respect to the first cylinder tube 8 as illustrated in FIG. 14, or may be provided in the radial direction with respect to the first cylinder tube 8 as illustrated in FIG. 12. Further, the second compressed-fluid inflow/outflow ports 16 and the second compressed-fluid control valve 19 may be provided to the pressure-receiving piston 2 as illustrated in FIG. 14, or may be provided to the first cylinder tube 8 as illustrated in FIG. 12 and FIG. 13.

Other configurations are similar to those of the first embodiment described above.

As described above, according to the brake device of the seventh embodiment, the axial length and a radial length of the brake device are adjusted at the stage of design to manufacture a brake device for a hoisting machine that exerts the same performance.

Eighth Embodiment

In the above-mentioned sixth embodiment, the pressure storage container 7 is mounted in the radial direction with respect to the pressure-receiving piston 2 so as to be integrated with the cylinder tube 8. In the case of those structures, as compared to the case in which the pressure storage container 7 is not integrated with the cylinder tube 8, the radial length of the brake device is required to be increased in order to increase the volume of the pressure storage chamber 13.

In view of this, in a brake device according to an eighth embodiment of the present invention, the pressure storage container 7 is arranged adjacent to the first cylinder tube 8 in a shape in which the pressure storage container 7 extends in both the axial direction and the radial direction.

Figure 15:
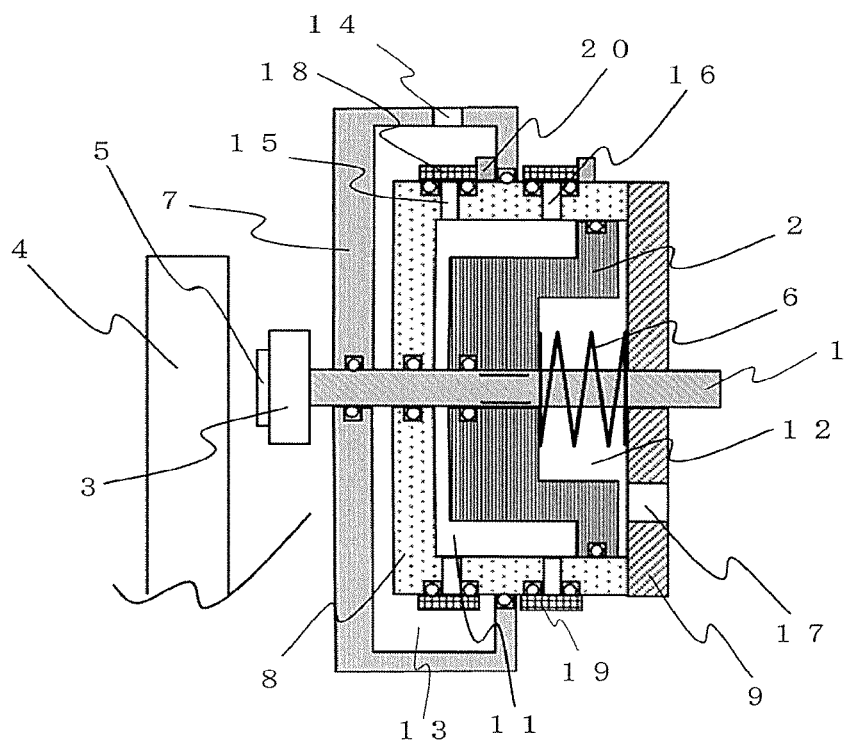
FIG. 15 is a sectional view for illustrating a brake device according to an eighth embodiment of the present invention.

In this case, the first compressed-fluid inflow/outflow port 15 and the first compressed-fluid control valve 18 may be provided to the circumferential surface of the first cylinder tube 8 as illustrated in FIG. 15, or may be provided in the radial direction with respect to the first cylinder tube 8 as illustrated in FIG. 13. Further, the second compressed-fluid inflow/outflow ports 16 and the second compressed-fluid control valve 19 may be provided to the pressure-receiving piston 2 as illustrated in FIG. 14, or may be provided to the first cylinder tube 8 as illustrated in FIG. 15.

Other configurations are similar to those of the above-mentioned sixth embodiment.

As described above, according to the brake device of the eighth embodiment, the axial length and the radial length of the brake device are adjusted at the stage of design to manufacture a brake device for a hoisting machine that exerts the same performance.

REFERENCE SIGNS LIST 1 rod, 2 pressure-receiving piston, 3 shoe, 4 disc, 5 lining, 6 spring device, 7 pressure storage container, 8 first cylinder tube, 9 second cylinder tube, 10 pressure control chamber, 11 first pressure control chamber, 12 second pressure control chamber, 13 pressure storage chamber, 14 pressure storage unit compressed-fluid inflow/outflow port, 15 first compressed-fluid inflow/outflow port, 16 second compressed-fluid inflow/outflow port, 17 third compressed-fluid inflow/outflow port, 18 first compressed-fluid control valve, 19 second compressed-fluid control valve, 20 motor and motor drive transmission portion, 21 sealing member, 22 compressor, 23 air tank, 24 components such as air dryer, line filter, and aftercooler, 25 components such as regulator and filter, 26 first compressed-fluid control valve interior inflow/outflow port, 27 second compressed-fluid control valve interior inflow/outflow port, 28 groove, 29 valve spring device, 30 valve activation coil, 31 valve protrusion, 32 valve rocking device, 33 diaphragm

The invention claimed is:
1. A brake device, which is configured to perform braking and releasing of a disc by moving a rod having a lining at a leading end of the rod by a spring device, the brake device comprising:
a pressure storage unit configured to store a compressed fluid; and
a pressure control unit comprising a pressure-receiving piston mounted to the rod in a cylinder tube arranged in direct contact with the pressure storage unit,
the pressure control unit comprising a first inflow/outflow port, a second inflow/outflow port, a first control valve configured to control opening and closing of the first inflow/outflow port, and a second control valve configured to control opening and closing of the second inflow/outflow port,
wherein, when the disc is to be released, the first control valve is opened and the second control valve is closed to cause the compressed fluid in the pressure storage unit to pass through the first inflow/outflow port to flow into the pressure control unit, to thereby move the pressure-receiving piston to a position for the releasing, and
wherein, when the disc is to be braked, the first control valve is closed and the second control valve is opened to cause the compressed fluid that has flowed into the pressure control unit to pass through the second inflow/outflow port to be released to an atmosphere, to thereby return the pressure-receiving piston to a position for the braking.

2. A brake device according to claim 1, wherein the first control valve and the second control valve have positional relationships relative to the first inflow/outflow port and the second inflow/outflow port, which are set in advance so that inverse opening and closing operations are performed with respect to the first inflow/outflow port and the second inflow/outflow port.

3. A brake device according to claim 2, wherein the pressure storage unit comprises a pressure storage chamber and a diaphragm that is swelled in an annular manner except for a part of the rod with respect to the first control valve and the second control valve in an axial direction of the cylinder tube.

4. A brake device according to claim 2, wherein the pressure storage unit is arranged adjacent to the cylinder tube in a shape in which the pressure storage unit extends also in a radial direction of the cylinder tube.

5. A brake device according to claim 1,
wherein the pressure storage unit is arranged adjacent to the cylinder tube on the same side as the lining in an axial direction of the cylinder tube,
wherein the first inflow/outflow port is formed in a front portion of the cylinder tube, and
wherein the second inflow/outflow port is formed in the pressure-receiving piston, and is connected to an atmosphere through a third inflow/outflow port formed in a rear portion of the cylinder tube, which supports the spring device.

6. A brake device according to claim 1, wherein the first control valve and the second control valve are each configured to interlock with a mechanism comprising a motor and a motor drive transmission portion.

7. A brake device according to claim 1, wherein the pressure storage unit is arranged adjacent to a circumferential surface of the cylinder tube.

8. A brake device according to claim 1,
wherein the pressure storage unit is arranged adjacent to a rear portion of the cylinder tube, and wherein the first inflow/outflow port has an inlet being a space between the rear portion of the cylinder tube and the pressure-receiving piston, passes through an inside of an outer shell of the cylinder tube, and has an outlet being a space between the pressure-receiving piston and a front portion of the cylinder tube.

9. A brake device according to claim 1,
wherein the pressure storage unit is arranged adjacent to the cylinder tube on the same side as the lining in an axial direction of the cylinder tube,
wherein the first inflow/outflow port is formed in a front portion of the cylinder tube, and
wherein the second inflow/outflow port is formed so as to connect a space between the pressure-receiving piston and a front portion of the cylinder tube to an atmosphere.

10. A brake device according to claim 1,
wherein the pressure storage unit is arranged adjacent to the cylinder tube in a circumferential direction of the cylinder tube,
wherein the first inflow/outflow port is formed in a circumferential surface of the cylinder tube at a position for connecting a space between a front surface of the cylinder tube and the pressure-receiving piston to the pressure storage unit, and
wherein the second inflow/outflow port is formed in the circumferential surface of the cylinder tube at a position for connecting the space between a front portion of the cylinder tube and the pressure-receiving piston to an atmosphere.

11. A brake device according to claim 10, wherein the pressure storage unit is arranged adjacent to the cylinder tube in a shape in which the pressure storage unit extends also in an axial direction of the cylinder tube.

12. A brake device according to claim 1, wherein the first control valve and the second control valve each have inflow/outflow ports formed intermittently in a circumferential direction of the cylinder tube, and are structured to rotate to open and close the first inflow/outflow port and the second inflow/outflow port.

13. A brake device according to claim 1, wherein the first control valve and the second control valve each have parts that extend intermittently in a radial direction of the cylinder tube, and are structured to rotate to open and close the first inflow/outflow port and the second inflow/outflow port.

14. A brake device according to claim 1, wherein the first control valve and the second control valve are structured to be driven in an axial direction of the cylinder tube by a valve spring device to open and close the first inflow/outflow port and the second inflow/outflow port.

15. A brake device according to claim 14, wherein the first control valve and the second control valve are structured to have tapered leading ends to open and close the first inflow/outflow port and the second inflow/outflow port.

16. A brake device according to claim 1, wherein the first control valve and the second control valve are structured to be driven in a direction perpendicular to an axis of the cylinder tube by a valve rocking device to open and close the first inflow/outflow port and the second inflow/outflow port.

17. The brake device according to claim 1, wherein a portion of the cylinder tube forms a seal of the pressure storage unit.

18. The brake device according to claim 1, wherein the rod is arranged to pass through the pressure storage unit and the pressure control unit.

* * * * *